(12) United States Patent
Kretsch

(10) Patent No.: US 6,622,436 B1
(45) Date of Patent: Sep. 23, 2003

(54) GOOSE BARRIER

(76) Inventor: Kevin Robert Kretsch, 18215 34th Ave. North, Plymouth, MN (US) 55447

( * ) Notice: Subject to any disclaimer, the term of this patent is extended or adjusted under 35 U.S.C. 154(b) by 0 days.

(21) Appl. No.: 09/586,290

(22) Filed: Jun. 2, 2000

(51) Int. Cl.$^7$ .......................... E04H 17/00; E04H 17/14
(52) U.S. Cl. ............................ 52/101; 256/40; 256/44
(58) Field of Search .......................... 52/101; 256/1, 256/11, 23, 39, 22, 46, 37, 40, 41, 44, 47, 48, 68.14; 119/903, 713; 43/1, 26.1, 58, 98, 131

(56) References Cited

U.S. PATENT DOCUMENTS

| | | |
|---|---|---|
| 528,218 A | 10/1894 | Allison |
| 675,043 A | 5/1901 | Hornback |
| 680,342 A | 8/1901 | Martin .......................... 52/298 |
| 1,378,948 A | 5/1921 | Hage ............................ 52/298 |
| 1,592,030 A | 7/1926 | Langsner ................. 242/395.1 |
| 1,761,592 A | 6/1930 | Seidel ........................ 242/395 |
| 2,102,917 A | 12/1937 | Rolland ...................... 242/395 |
| 2,236,305 A | 3/1941 | Ahlin ......................... 242/397 |
| 2,245,823 A | 6/1941 | Rappaport ................... 242/395 |
| 2,752,106 A | 6/1956 | Thompson ................. 242/55.2 |
| 3,148,417 A | * 9/1964 | Bellas .......................... 52/101 |
| 3,709,445 A | 1/1973 | Adams ....................... 242/395 |
| 4,057,221 A | * 11/1977 | Leath ........................... 256/40 |
| 4,070,007 A | * 1/1978 | Minor et al. .................. 256/19 |
| 4,531,682 A | 7/1985 | Schroder et al. .............. 242/54 |
| 4,937,988 A | * 7/1990 | Gratton ........................ 52/101 |
| 5,092,088 A | * 3/1992 | Way ............................ 52/101 |
| 5,332,196 A | * 7/1994 | Wright ........................ 256/47 |
| 5,570,537 A | * 11/1996 | Black et al. .................. 43/112 |
| 5,584,444 A | * 12/1996 | Farmer ....................... 242/395 |
| 5,588,613 A | 12/1996 | Nagy .......................... 242/395 |
| 5,606,830 A | * 3/1997 | Twonsend, Jr. et al. ...... 52/101 |
| 5,649,690 A | * 7/1997 | Kilmer ........................ 256/35 |
| 5,791,501 A | * 8/1998 | Baldwin, Jr. ................. 211/183 |
| 5,845,607 A | * 12/1998 | Kastner et al. ........... 52/101 X |
| 6,003,471 A | * 12/1999 | Ohba ........................ 52/101 X |
| 6,102,321 A | * 8/2000 | Clary ....................... 242/388.4 |

FOREIGN PATENT DOCUMENTS

| | | | | |
|---|---|---|---|---|
| DE | 3820836 | * | 12/1989 | ................. 52/101 |
| GB | 960179 | * | 6/1964 | ................. 52/101 |
| GB | 2250172 | * | 6/1992 | ................. 52/101 |
| WO | 93116590 | * | 9/1993 | ................. 52/101 |

OTHER PUBLICATIONS

Sax, N. Irving and Lewis, Richard J., Hawley's Condensed Chemical Dictionary, 11 ed. Sep. 17, 1987, p. 938.*

* cited by examiner

Primary Examiner—Jeanette Chapman
(74) Attorney, Agent, or Firm—Schwegman, Lundberg, Woessner & Kluth, P.A.

(57) ABSTRACT

A method of deterring to waterfowl trespass onto a real estate property, particularly a property bordering onto a body of water inhabited by geese, and an effective barrier for doing so, is disclosed. The barrier consists in its simplest form as a pair of lines suspended above a property surface, one line at 3 to 10 inches high, a second line at 8 to 30 inches high, with a separation between lines of at least 5 inches. The lines are suspended by means of an array of posts. Preferably, a dispenser for feeding a line from a spool and also for retracting the line is mounted on one of the posts. The barrier is optimally removable, including means for retracting the line and for conveniently removing the posts from receptacles in the property surface. Thus, a property owner or user is allowed full recreational access to the property without the problem of goose droppings on the protected property.

21 Claims, 1 Drawing Sheet

GOOSE BARRIER

FIELD OF THE INVENTION

The present invention relates to a method and apparatus for averting trespass of geese and other waterfowl on property, particularly property adjacent to bodies of water.

BACKGROUND OF THE INVENTION

Lawns, walkways, picnic areas, and other properties adjacent to ponds, lakes and rivers are often frequented by waterfowl, with the drawback that these birds typically leave excrement throughout their wanderings over these properties. In recent decades, large numbers of Canadian geese have acclimated to human activity, and have exploded in number within urban centers, as well as suburban and rural lakes. Business properties and housing projects often include ponds and other waterways within open green spaces. These ponds naturally draw waterfowl, especially the aforementioned Canadian geese. Neighboring lawns provide particularly attractive feeding areas for these geese. A common sight at many such locations is a string of geese walking onto a lawn from the water's edge, to feed on the grass. These flocks of geese will even cross busy roadways to reach such attractive feeding areas. Golf courses are also plagued with geese populations for the same reasons.

Because of the ubiquitous droppings of waterfowl on these lawns, particularly those of geese, affected property owners cannot fully enjoy their properties. Lakeside homeowners, golfers, noontime walkers in business campuses, people on a picnic at a park with a pond—all must watch their steps.

Some methods have been put forth in an effort to control the problem of goose trespass and goose droppings. Stuffed effigies of swans, hawks and eagles have been mounted on poles, buildings and tree limbs to scare away waterfowl. These have some effect on smaller fowl such as ducks, but little or no effect on larger fowl such as geese. Some golf courses and industrial campuses have employed trained border collies, which discourage Canadian geese habitation due to their movements, which resemble the movements of predatory foxes in the wild. Homeowners on lakefront properties cannot reasonably go to such an extreme to deter trespass of Canadian geese. Crisscrossing lines of colored or reflective fibers have been strung over small ponds. These crisscrossing lines have been relatively effective on deterring flocks of waterfowl from landing on the ponds. These lines are unsightly, however, and are practical for use only on small bodies of water. They are totally unacceptable on ponds and lakes large enough to invite recreation with boats, canoes, and other personal water craft. Similarly, arrays of reflective streamers or lines loaded with reflective tinsel have been erected on water frontage properties to visually repel waterfowl. A large number of such streamers, erected by property owners in a localized area around a lake or pond, becomes in itself a visual blight. A further problem of such streamers is that they interfere commonly with ordinary activities on the affected properties, including recreation, lawn mowing, and so forth. A recent device has even been developed for private lakefront lawns, wherein an intruder is detected by an electric eye and bombarded with a jet of water. Such a device, unfortunately, cannot adequately distinguish between a goose, a child, or a pet dog.

A continuing need exists for a method and means to deter unwanted,trespass by waterfowl, especially geese, on selected areas that would normally be inhabited by such waterfowl, wherein the means of deterrence is not visually a blight in itself.

It is an object of this invention therefore to provide an improved method and means of deterring waterfowl trespass on selected property.

It is a further object of this invention to deter waterfowl trespass on selected properties in a manner that does not create in itself a visual blight.

It is a further object of the invention to provide a method and means of waterfowl deterrence that is inexpensive, easily installed, and easily taken down, providing little interference to ordinary activities on the properties to be protected thereby.

These and other objects of the invention are fulfilled by means of the invention disclosed hereinbelow.

SUMMARY OF THE INVENTION

A method and means to deter trespass of waterfowl, particularly geese, onto a real estate property, particularly a property bordering onto a body of water, has been discovered and is herein disclosed. The barrier disclosed herein is surprisingly simple in its structure, yet surprisingly effective also in meeting the objects mentioned above. The barrier or fence, in its simplest embodiment, includes a first and a second line, both lines being suspended above and generally parallel to a surface of a property and defining a boundary on this surface, the first line being suspended at about 3 to 10 inches above the surface, the second line being suspended at about 8 to 30 inches above the surface and juxtaposed above the first line, a separation of at least about 5 inches being interposed between the first and second lines. The lines are conveniently suspended by means of posts, and the lines are conveniently made of plastic monofilament, such as fishing line. Though occupying only a fraction of a percent of air space along a desired boundary, these lines provide thereby an effective barrier to a goose walking.

A preferred embodiment of the goose fence is a retractable fence having a pair of lines, both lines being suspended above and generally parallel to a surface of a property and defining a boundary on this surface, a first line being suspended at about 3 to 10 inches above the surface, a second line being suspended at about 8 to 30 inches above the surface and juxtaposed above the first line, a separation of at least about 5 inches being interposed between the first and second lines, the first and second lines being fed from at least one rotatable spool mounted on a starting post, the lines traversing to an ending post, a means being provided for rewinding the lines onto a rotatable spool on the starting post, and a means for holding such lines in a taut arrangement providing thereby an effective barrier to a goose walking. The first and second lines are preferably connected end-to-end to form a single overall line, the latter being fed from a single spool. A plurality of intermediate posts are advantageously provided for suspending the lines along a boundary between the starting post and the ending post. The lines are suspended on the intermediate posts by means of loops, slots, wire pigtails, or orifices located in or on said intermediate posts. The posts are set in receptacles located in the surface of the property, the posts being reversibly removable from said receptacles, particularly when the line is retracted and rewound onto the spool. Such a retractable fence, when erected, provides thereby an effective barrier to a goose walking, is easily removable when the owner or user of the property desires unfettered access to the full property, and is easily re-erected, admirably meeting the various objects of the invention. Use of this invention effectively provides a method of deterring goose trespass upon the property.

DESCRIPTION OF THE INVENTION

Figure 1:
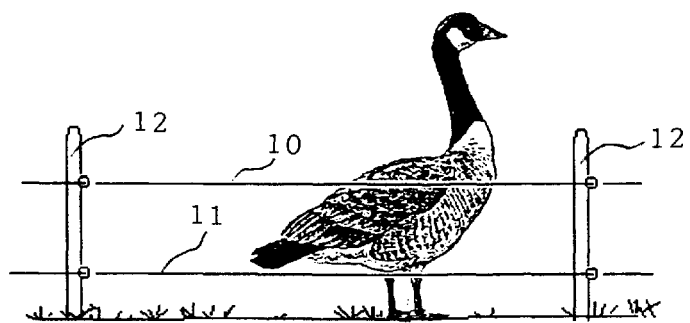
FIG. 1 is a schematic diagram of a simplified goose barrier.

In its simplest form, the invention may be seen in FIG. 1 as a waterfowl barrier fence, wherein two lines 10, 11 are suspended in air above the ground surface of a real estate property, these two lines defining a boundary on the surface that fences off a portion of the real estate property from trespass by geese on foot. These two lines are preferentially arranged so that they are not only generally parallel with the surface, and are also generally parallel with each other, one line being suspended above the other line. Where the surface of the boundary undulates or follows a non-level slope, the lines may not be exactly parallel with the boundary surface. Nevertheless, optimally they will be suspended so as to follow generally the contour of the boundary surface, this being understood and included in the meaning of the term "generally parallel." More than two lines may be employed within the scope of the invention, but it has been found that two lines are generally sufficient for attainment of the purposes of the invention. Additionally, the two lines may be connected end-to-end to form a single overall line; otherwise stated, a single line may be continuously strung so as to include two portions of the single line equivalent to two lines suspended in accord with the description provided immediately above.

The two lines 10, 11 are suspended by means of a plurality of above-ground members or posts 12, preferably two or more stakes generally arranged vertically, with means for attachment of the lines to the above-ground members. These members may be metal rods, wooden stakes, rock or concrete formations, plastic or fiberglass articles, stems or trunks of growing bushes and trees, or any other suitable above-ground member desirable to the owner or user of the property. Combinations of such above-ground members may be used. For purposes of simplifying claim language, these various above-ground members are herein collectively defined as "posts." The posts 12 are preferably rigid and resistant to outdoor weathering. Metallic stakes are particularly preferably for use as the posts for suspending the lines.

The path of the two lines may follow a straight line, or alternatively may follow a curved, zig-zag, or box-shaped paths. Such pathways are generally to be defined by the property owner or user with due regard to fencing off a desired plot of ground from trespass by geese. For example, a property abutting a body of water frequented by waterfowl is often preferentially protected by means of a fence as herein described, following a boundary facing the body of water, and with turns from this main boundary into flanks at either or both ends, the flank segments of the fence being sufficiently long to inhibit trespass of waterfowl simply by walking around the end of an otherwise straight fence.

The lines 10, 11 may consist of cotton string, glass fiber, metal wire, plastic filament, or other suitable materials similar in shape and function. Plastic filament is generally preferable. Suitable plastics include, for instance, polyethylene, polypropylene, polyester, nylon or polyvinylidene fluoride. Particularly advantageous are monofilament plastic lines commonly available as fishing lines. Such lines are conveniently obtained, already wound on spools, from suppliers of fishing tackle.

The two lines are preferably suspended in a height range of about 3 inches to about 30 inches above the property surface, more preferably about 5 inches to 20 inches. The first line is preferably suspended at a height of about 3 to 10 inches above the surface of the property along the boundary, more preferably 6 to 8 inches high, and the second line at a height of about 8 to 30 inches above the surface along the same boundary, more preferably 12 to 20 inches high, with a minimum of about 5 inches separation between the first and second lines, more preferably a separation of about 8 to 12 inches between them.

As a general guide, the optimum height of the first line is believed to be at or moderately above the knee joint of a targeted waterfowl. The optimum height of the second line is believed to be below the normal eye level of the waterfowl but at or moderately above the height of the back of the waterfowl. Thus, the waterfowl must simultaneously stoop to step underneath the upper line, while raising itself to step over the first line. In that the size of waterfowl may vary considerably from bird to bird, the heights of the two lines may be varied for best effect. For geese, especially the commonly encountered species known as Canadian geese, it has been found that the first line is optimally suspended at a height of about 7 inches, and the second line is optimally suspended at a height of about 17 inches. A third, and even a fourth, line may be added to the fence in the case of particularly pesky waterfowl, but these added lines are not believed to be necessary in all but the most unusual circumstances.

While the invention is described in terms of first and second lines, the terms "first" and "second" do not have a chronological meaning attached. Either of these lines in a fence row may be set up prior to the other. And, where the first and second lines are sections of one continuous line strung along a first and second path, either path may be set up prior to the other path chronologically.

Figure 2:
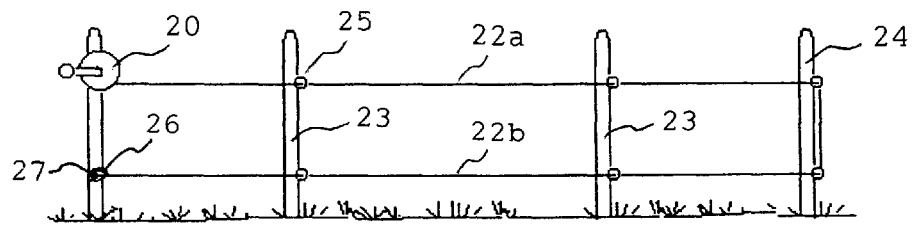
FIG. 2 is a schematic diagram of a retractable goose barrier including a line dispenser.

A preferred embodiment of the invention is shown in FIG. 2 wherein a line dispenser 20 is positioned on a starting post 21, and a line 22a is fed from the line dispenser 20 to an ending post 24, following a path generally parallel to the surface of the ground between the starting post and the ending post, the line being suspended therein at a desired or selected height range. Optimally, the line is further continued from the ending post back to the starting post, but at a height range different than the initial path height, therein providing the second line 22b of the fence. The path of the line or lines may be generally varied and controlled by additional posts 23 interposed along the path. Such posts 23 may be interposed so as to cause the line to follow a path generally conforming to the contour of the ground surface underneath the line pathway, or to follow a desired boundary which need not be straight but may delineate a curve, a bend, a corner turn, or even a zig-zag. The defined pathway may include, for example, a connection to a dock extending from a waterfront property out into a body of water.

The line dispenser 20 depicted in FIG. 2 advantageously includes a spool of a line, such as a monofilament fishing line, the spool being rotatable within a housing attachable to the starting post. The dispenser preferably includes a means for rotating the spool so as to rewind the line when desired. The dispenser preferably also includes a means for fixing the position of the spool so that the line cannot play out beyond what is desired. This latter feature advantageously allows a user of the goose barrier to fix and hold the line is a reasonably taut condition as it is suspended in its pathway between the starting post and the ending post. These three features may all be found in a fishing reel. It is desirable in the context of this invention, however, to locate the spool of line inside of a cover, such that the spool of line is protected from environmental attack by sunlight, precipitation, falling leaves, assault by rodents and other animals, and so forth. Thus, while attachment of a fishing reel to a post suffices as an element of the invention being described herein, the preferred embodiment of the invention will preferably incorporate a protective enclosure for a spool of a line as a feature of the dispenser. The protective enclosure will preferably include a cavity for accepting a spool of line, a crank means for engaging the spool so as to turn it or alternately to prevent it from turning further, an opening or conduit for communication of the line from the spool to space outside the protective enclosure, and a means for attachment of the protective enclosure to the starting post. It will be evident to one of ordinary skill in the art of dispensers that several ways may be found for accomplishing these attributes.

The line 22a being fed from the dispenser 20 may be passed along a series of posts 23 on its way to the ending post 24, and may be returned from the ending post 24 through a series of posts 23 to a termination at the starting post 21. Attachment to each of these posts may be by any number of means. However, it is preferable to provide a means of attachment 25 whereby the line may be easily attached and also easily withdrawn. Such means of attachment 25 may include, for example, a slot, a loop, a hook, or an orifice in the post. Particularly advantageous is a line guide patterned after a wire hose clamp, wherein the ends of the hose clamp are formed into loops for accepting and guiding the line, the clamp being made of spring steel so that it can be easily moved up or down a post to a desired height. The line preferably will have a loop 26 or similar means of engagement at its end, whereby the line may be facilely attached to a protuberance 27 (such as the head of a screw) on a post at the termination of the line pathway. The loop 26 or other means of engagement on the end of the line will preferably be of small size, such that upon rewinding of the line onto the spool, the end of the line will easily pass through the attachment points 25 on each of the posts without snagging or jamming. In a variation of the invention where the line terminates on a post from which the line is also dispensed, the end of the line may advantageously be durably affixed to this post, and yet be part of a retractable fence. This is further elaborated below.

Figure 3:
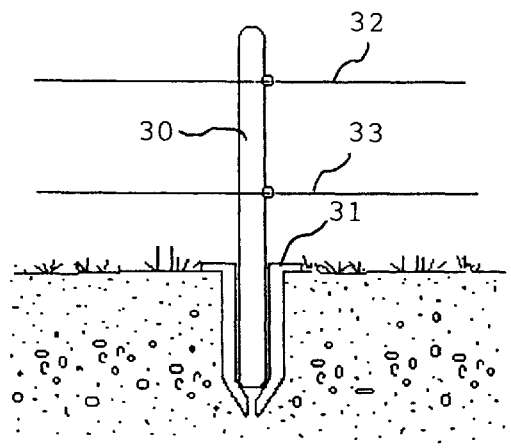
FIG. 3 is a schematic diagram illustrating a means for erecting a post of a retractable barrier.

It is a desired feature of the invention that the goose barrier be easily set up and easily taken down. The user of the property will likely desired unfettered access to the ground surface under the goose barrier for purposes of mowing the grass or otherwise grooming the surface. Also, when full recreational use of the property is intended, the fence may constitute a nuisance at such a time. Facile removal and set up of the fence may be accomplished when the line is easily retractable and the posts are easily removed. Means to make the line easily retractable have been presented immediately above. The posts themselves are conveniently removed from the boundary if they are removably set into receptacles inserted into the ground. FIG. 3 illustrates a simple means of erecting a post 30, wherein a receptacle 31 is installed into the ground, and an opening in the receptacle receives a post 30 upon which the line or lines 32, 33 are to be attached. When the posts are easily removable and the line extends from a dispenser on the starting post to termination on the self same post, its end being durably affixed to the starting post or otherwise modified so as not to be able to slip back through the wire guides (such as attachment of a washer to the end of the line), the starting post may be picked up and the line retracted onto the reel while the post is walked or otherwise moved along the boundary of the protected property. Wherever an intervening post is encountered, it may be easily picked up as well and carried alongside the starting post, while the line continues to be retracted. Thus, an entire row of posts may be easily removed, with the line remaining in a pathway threaded through the full set of the posts, wherein the line may be wound snugly through the set of posts, actually helping to hold the set of posts adjacent one another, e.g., in a bundle, together for easy handling and storage.

Thus, by means of the designs and features illustrated in the above description, a property user or owner may conveniently prohibit trespass by geese and other waterfowl on the property by erecting a goose barrier fence that is easily put up, and also easily retracted and taken down. In a location fronting on a body of water, this fence is especially useful in deterring trespass by geese and other waterfowl afoot, these fowl not willing to cross through even this simplest of fences and become separated from their body of water by the fence. The fence can be also very non-obtrusive to property owners and users, in that a line consisting of a transparent plastic monofilament may be chosen such that a goose most definitely perceives the line when approaching the fence, but the owner or property user does not perceive the line from a distance, and is not visually repulsed by such an unobtrusive fence. In a situation wherein the owner or property user wants increased visibility of the fence, flags may be affixed to either line, both lines, or to any point on the line wherein a single overall line is strung through a set of posts. The flags may consist of any of a number of materials such as cloth, plastic, or metal, including metallic foil and colored string as examples. Optionally, such flags may be loosely attached onto the line so as to allow sliding contact of the line during retraction of the fence. Alternatively, the flags may be easily disengaged from the line. Any number of means for hanging or affixing flags to a line will be evident an owner or user of the fence.

The above description has provided details for a goose barrier, both in its most simplified form and in its most preferred embodiment as presently contemplated. The scope and breadth of the invention are not limited by the features specifically delineated in the above description, however, but are to be judged by the claims that follow.

I claim:

1. A goose fence comprising:
   two or more receptacles which are mountable in a ground surface such that each receptacle includes an open end approximately flush with the ground surface;
   two or more posts, each of which are adapted to be removably mounted to one of the receptacles; and
   first and second lines, both lines being suspended above and generally parallel to the ground surface and defining a boundary on the ground surface, said first and second lines being mounted to and stretching between the two or more posts, said first line being suspended at about 3 to 10 inches above the ground surface, said second line being suspended at about 8 to 30 inches above the ground surface and juxtaposed above said first line, a separation of at least about 5 inches being interposed between said first and second lines, providing thereby an effective barrier to a goose walking along the ground surface between the two or more posts, wherein said first and second lines are connected end-to-end to form a single overall line.

2. The fence according to claim 1 wherein said lines comprise a transparent polymeric monofilament.

3. The fence according to claim 1 wherein each of the receptacles includes a generally circular shaped top opening and each of the posts is generally cylindrically shaped to fit through the top opening.

4. A retractable goose fence comprising first and second plastic filament lines, both lines being suspended above and generally parallel to a ground surface of a property and defining a boundary on the ground surface, said first line being suspended at about 3 to 10 inches above the ground surface, said second line being suspended at about 8 to 30 inches above the ground surface and juxtaposed above said first line, a separation of at least about 5 inches being interposed between said first and second lines, said first and second lines being fed from at least one rotatable spool mounted on a starting post which is mountable to the ground surface, said lines traversing to an ending post which is mountable to the ground surface, a means being provided for rewinding said lines onto a rotatable spool on the starting post, and a means for holding such lines in a taut arrangement, providing thereby an effective barrier to a goose walking along the ground surface between the starting post and the ending post, wherein the first and second lines are connected end-to-end to form a single overall line, the single overall line being fed from a single spool.

5. The fence according to claim 4 wherein a plurality of intermediate posts are provided for suspending said lines along a boundary between the starting post and the ending post.

6. The fence according to claim 5 wherein the lines are suspended on the intermediate posts by means of loops, slots, wire pigtails, or orifices located in or on said intermediate posts.

7. The fence according to claim 4 wherein each of the posts are set in receptacles located in the ground surface of the property, each of the posts being reversibly removable from said receptacles.

8. The fence according claim 4 wherein the single overall line terminates at the starting post in a manner wherein it is durably affixed to the starting post, wherein all posts with which the line is connected are set in receptacles which are mounted in the ground and are reversibly removable from the receptacles, the fence being retractable by rewinding the line onto a spool while removing the posts and placing them adjacent one another.

9. The fence according to claim 6 wherein flags may be affixed to at least one of the lines for visibility.

10. The fence according to claim 9 wherein flags may be affixed to the single overall line for visibility.

11. A method of deterring trespass by geese onto a property, the method comprising:

providing two post mounted into a surface;

suspending to the at least two post at least two plastic filament lines above and generally parallel to a ground surface of a property, said lines defining a boundary on the ground surface, suspending a first line at about 3 to 10 inches above the ground surface, suspending a second line being suspended at about 8 to 30 inches above the ground surface and juxtaposed above said first line, separated at least about 5 inches being interposed between said first and second lines, providing said first and second lines which connected end-to-end to form a single overall line, and said lines providing thereby an effective barrier to a goose walking across the ground surface boundary defined by the suspended lines.

12. The method fence according to claim 11 wherein said lines of the barrier comprise a transparent polymeric monofilament.

13. The method according to claim 11 wherein said lines are suspended by means of attachment to a plurality of posts arranged along the boundary.

14. The method according to claim 11 wherein flags may be affixed to at least one of the lines for visibility.

15. The method according to claim 11 wherein flags may be affixed to the single overall line for visibility.

16. The method according to claim 11 wherein a portion of the boundary borders a body of water and a segment at either end of this portion of the boundary turns into a flank extending away from the body of water.

17. The method of claim 11, wherein the first line is suspended about 7 inches above the ground surface and the second line is suspended about 17 inches above the ground surface.

18. An apparatus for preventing geese from walking across a boundary, the apparatus comprising:

a plurality of posts adapted to be removably mountable in a ground surface such that each of the plurality of posts extends in a generally vertical manner; and first and second plastic filament lines attached to each of the plurality of posts, wherein the first and second lines are suspended above and generally parallel to the ground surface and define a boundary on the ground surface, said first line being suspended at about 3 to 10 inches above the ground surface, said second line being suspended at about 8 to 30 inches above the ground surface and juxtaposed above said first line, a separation of at least about 5 inches being interposed between said first and second lines, wherein said first and second lines are connected end-to-end to form a single overall line, wherein the first line is directly aligned over the second line such that a goose would have to simultaneously stoop under the first line and step over the second line, wherein the goose is prevented from walking across the boundary between the posts.

19. The apparatus of claim 18, further comprising a plurality of receptacles mountable in the ground for receiving an end of one of the plurality of posts to removably mount the plurality of posts into the ground.

20. A method for preventing geese from walking on a ground surface across a boundary, the method comprising:

mounting at least two receptacles into the ground surface such that a top open end of each receptacle is approximately flush with a surface of the ground surface;

mounting an end of a first post into one of the receptacles;

mounting an end of a second post into another of the receptacles; and suspending at least two lines by attaching the lines to the first and second posts such that the lines define a boundary, wherein the first line is suspended at about 3 to 10 inches above the ground surface, and the second line is suspended at about 8 to 30 inches above the ground surface and juxtaposed above said first line, a separation of at least about 5 inches being interposed between said first and second lines, wherein said first and second lines are connected end-to-end to form a single overall line, said lines providing thereby an effective barrier to a goose walking along the ground surface across the boundary defined by the suspended lines.

21. The method of claim 20, wherein the first line is suspended about 7 inches above the ground surface and the second line is suspended about 17 inches above the ground surface.

* * * * *